Dec. 8, 1931.  S. B. BOWMAN  1,835,690
FLOATING BRIDGE WALL
Filed Sept. 12, 1927
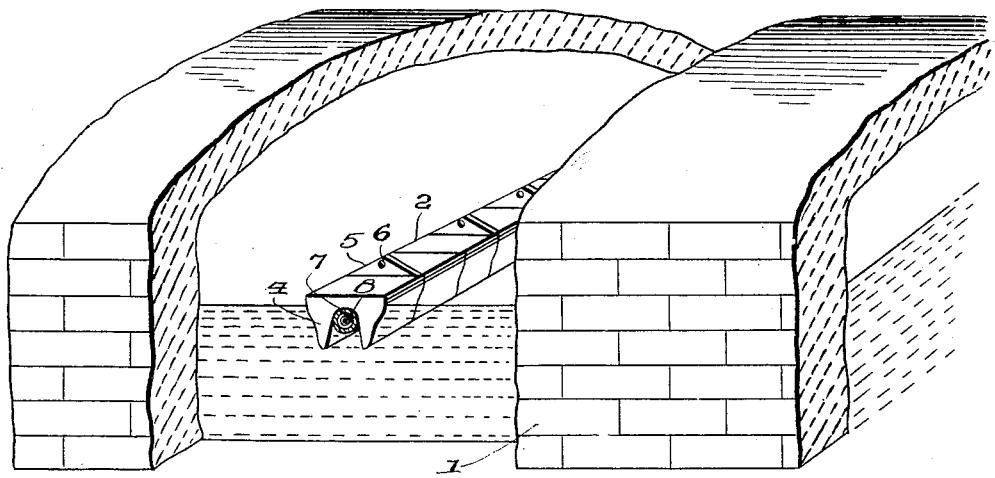
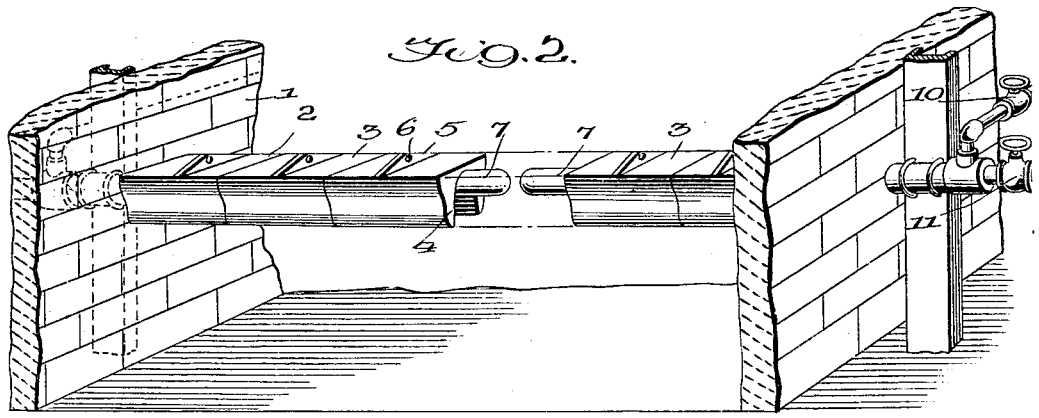
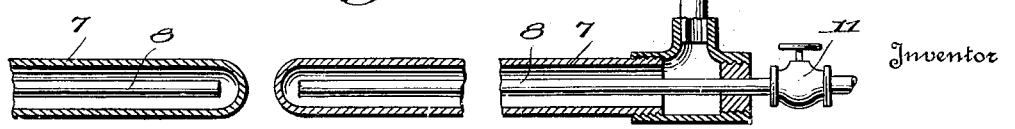
Inventor
SAMUEL B. BOWMAN,
By Eccleston & Eccleston
Attorneys Patented Dec. 8, 1931

1,835,690

UNITED STATES PATENT OFFICE

SAMUEL B. BOWMAN, OF ZANESVILLE, OHIO, ASSIGNOR TO HAZEL-ATLAS GLASS CO., OF WHEELING, WEST VIRGINIA, A CORPORATION OF WEST VIRGINIA

FLOATING BRIDGE WALL

Application filed September 12, 1927. Serial No. 219,091.

This invention relates to bridge walls for glass tanks, and the object of the invention is to provide a device of this character which is simple in construction, inexpensive to manufacture, effective in operation, and which may be quickly and easily replaced when necessary, thereby avoiding the expense and loss of production incident to the rebuilding of the bridge walls now in common use.

The common practice in glass tanks is to divide the refining end of the tank from the melting end thereof, by means of a bridge wall, the foundation of which rests on the floor of the tank, and the bridge wall extending above the level of the glass in the tank. Such bridge walls are provided with one or more submerged passages, through which the glass flows from the melting chamber to the refining chamber. The chemical and mechanical action of the glass flowing through these passages rapidly erodes the bridge wall; the life of such bridge walls is much shorter than the life of the tank. Means have been devised to prolong the usefulness of such bridge walls, but nevertheless their life falls far short of the average tank life. When it becomes necessary to replace one of these bridge walls, the tank had to be emptied, and the bridge wall rebuilt on the tank floor as its foundation. Of course, this required the suspending of operations over a long period, thereby seriously curtailing production. All of this is overcome in the present invention, in accordance with which the bridge wall may be easily replaced in a very short time, and without shutting down the tank.

In the following description of the particular apparatus illustrated, which is subject to various changes and modifications, reference is to be had to the accompanying drawings; in which, Figure 1 is a perspective view of a portion of a tank, with the walls thereof broken away to show a portion of the improved bridge wall.

Figure 2 is a perspective view of the bridge wall, and the water-cooling connections therefor; one of the bridge wall blocks being shown in outline to permit better illustration of the cooling pipes; and Figure 3 is a vertical longitudinal section through the cooling pipes; one of the pipes being shown broken away.

Numeral 1 indicates a portion of the walls of a glass tank, and arranged in this tank is the floating bridge wall which is referred to generally by numeral 2, and which occupies substantially the same position as the ordinary bridge wall.

The improved bridge wall is formed of a plurality of refractory blocks 3, which will float on the glass. The tops of these blocks extend slightly above the level of the glass, and the bottoms of the blocks are provided with a deep groove or channel 4, to form a saddle, which will receive the supporting or anchoring means, to be described hereinafter. The top of each block is preferably provided with a lug 5 having a hole 6; though, of course, the invention is in no manner limited to this specific construction of the blocks.

Extending inwardly from each side of the tank is a water pipe 7; the two pipes almost meeting in the center of the tank. Arranged in each of these pipes 7 is an inlet pipe 8, which extends substantially to the end of the outlet pipe 7. Extending upwardly from the upper side of the outlet pipe is an overflow pipe 9; and both this overflow pipe and the inlet pipe are provided with valves 10 and 11 respectively. By the specific construction described, the pipes 7 will be constantly filled with a stream of water. It is to be understood, however, that this invention is not limited to any particular means for supporting the blocks; a pipe extending entirely across the tank may be employed, or other means may be employed for cooling the pipe or pipes, or means other than pipes may be employed for supporting or anchoring the blocks.

As clearly shown in Figures 1 and 2, the bridge wall is constructed by merely placing the blocks end to end on the pipes, so that they will straddle the pipe and be anchored or supported thereby. For placing the blocks on the pipes any suitable tool may be employed, such as a long poker or rod, the end of which will be inserted in the hole 6 in the lug 5. The pipes supporting the blocks operate to form a region of chilled glass, which protects the pipes and the blocks; and it is also to be noted that the channel in the lower sides of the blocks functions as a pocket to retain the glass, which gradually becomes chemically inactive, thereby further extending the life of the blocks. But it is really not so important to extend the life of these blocks, for the replacement of them, or the construction of an entirely new bridge wall, is a very simple operation. For instance, when it becomes necessary, in due course, to replace the entire bridge wall or a portion thereof, it is only necessary to remove the worthless block or blocks by inserting a hooked poker, or the like, in the hole provided in the upstanding lug; new blocks being then inserted in the same manner. The anchoring means may be withdrawn whenever it is desirable to do so, in repairing or rebuilding the bridge.

Thus the bridge wall may be replaced or repaired while the glass is in the tank, and without even stopping the operation of the forming machines associated with the tank; but such repairs are preferably made between working periods at the end of the week. Thus, I not only avoid the large expense incident to rebuilding the conventional bridge walls, but also avoid the very serious loss of production resulting from the shutting down of the tank while the conventional bridge wall is being rebuilt.

It has been stated hereinbefore that the invention is in no manner limited to the particular cooling system disclosed; and it should be added that the invention is also not limited to any particular shape of the blocks, for it is apparent that the present disclosure suggests many modifications. The invention broadly contemplates the use of any kind of blocks arranged across the tank, and so constructed and so anchored or supported, that any one or all of the blocks may be readily removed and replaced, without interfering with the operation of the tank. And the appended claims are intended to cover all changes and modifications coming within the spirit of the invention.

What I claim is:

1. A bridge wall for glass tanks, including anchoring means extending transversely across the tank, a series of floating blocks extending transversely of the tank and associated with said anchoring means, said blocks being freely replaceable individually while the tank is in operation.

2. A bridge wall for glass tanks including anchoring means extending transversely across the tank, a series of floating blocks extending transversely of the tank and associated with said anchoring means, said blocks being in abutting but disconnected relation, and being freely removable individually while the tank is in operation.

3. A bridge wall for glass tanks, including anchoring means extending transversely across the tank, means for cooling said anchoring means, a series of floating blocks extending across the tank and associated with the anchoring means, said blocks being freely removable and replaceable individually while the tank is in operation.

4. A bridge wall for glass tanks including a series of floating blocks extending transversely across said tank, said blocks being arranged in abutting but disconnected relation, and means for retaining the blocks in the desired position in the tank, said blocks being individually removable and replaceable while the tank is in operation.

5. A bridge wall for glass tanks including anchoring means extending transversely across the tank, and a series of blocks mounted on said anchoring means and extending transversely across the furnace, said blocks being freely removable and replaceable individually.

6. A bridge wall for glass tanks, including a series of floating blocks extending transversely of the tank, a pipe anchoring said blocks said blocks being freely removable from and replacable on said pipe while the tank is in operation and means for cooling said pipe.

7. A bridge wall for glass tanks including a series of blocks extending transversely of the tank a pipe in said tank, and means for cooling said pipe, said blocks adapted to straddle said pipe.

8. A bridge wall for glass tanks, including a series of blocks extending transversely of the tank, aligned pipes extending inwardly from opposite sides of the tank, said blocks being anchored by and freely removable from said pipes.

9. A bridge wall for glass tanks, including a series of blocks extending transversely of the tank, said blocks having pockets for retaining glass, and means for anchoring said blocks, the blocks being freely removable from said anchoring means.

10. A bridge wall for glass tanks including a series of blocks extending transversely of the tanks, said blocks having pockets for retaining glass, and anchoring means in said pockets.

11. A bridge wall for glass tanks, including a series of blocks extending transversely of the tank, said blocks having pockets for retaining glass, anchoring means in said pockets, and means for cooling said anchoring means.

12. A bridge wall for glass tanks including a series of floating blocks arranged in abutting but disconnected relation, the lower portions of said blocks being saddle-shaped, aligned pipes extending inwardly from opposite sides of the tank, said blocks adapted to straddle the pipes, and means for maintaining a constant stream of cooling water in said pipes.

13. A bridge wall for glass tanks including a series of floating blocks arranged in abutting but disconnected relation, the lower portions of said blocks being saddle-shaped, aligned pipes extending inwardly from opposite sides of the tank, said blocks adapted to straddle the pipes, a water inlet pipe projecting into each of the first-mentioned pipes, an overflow pipe leading from the upper side of each of the first-mentioned pipes, and a valve in each of the overflow pipes and inlet pipes.

14. A bridge wall for glass tanks including a series of floating blocks arranged transversely of the tank, means for anchoring the blocks, said blocks being freely removable from the anchoring means, and lugs on the blocks facilitating the removal thereof.

15. A bridge wall for glass tanks including a series of floating blocks arranged transversely of the tank, means for anchoring the blocks, said blocks being freely removable from the anchoring means, and lugs projecting from said blocks, said lugs being provided with holes, for the purpose described.

SAMUEL B. BOWMAN.